July 9, 1957 R. M. LEE 2,799,011

MICRO-PIN SOCKET

Filed June 29, 1955

INVENTOR.
RICHARD M. LEE
BY Kenway, Jenney, Witter + Hildreth
ATTORNEYS 2,799,011
Patented July 9, 1957

2,799,011

MICRO-PIN SOCKET

Richard M. Lee, Brookline, Mass.

Application June 29, 1955, Serial No. 518,839
5 Claims. (Cl. 339—256)

Figures 1, 2, 3, 4:
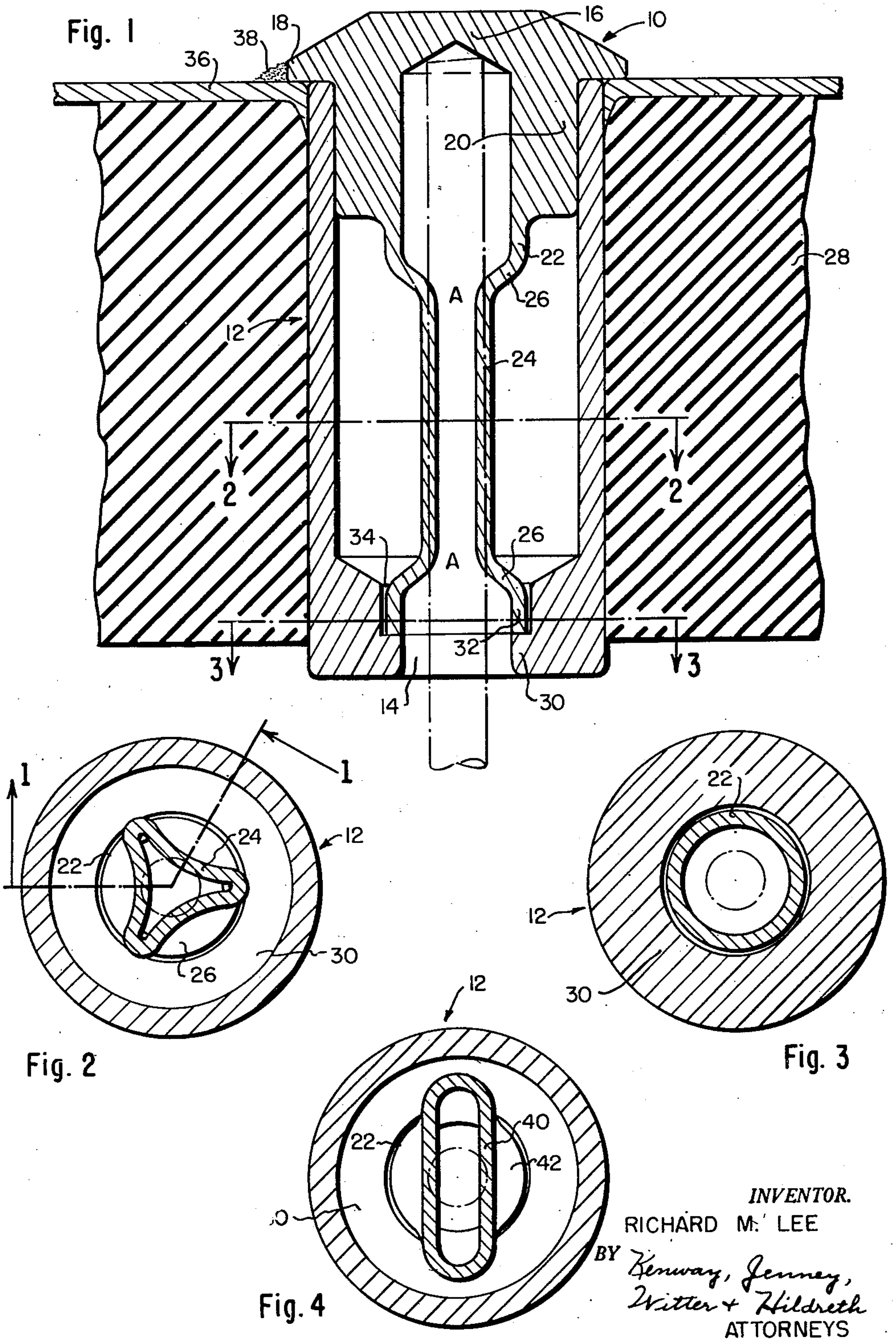

This invention relates to sockets for electrical lead wires and more particularly to sockets adapted to receive very fine lead wires in electronic apparatus of greatly reduced size.

In keeping with the modern trend towards the use of transistors and the production of electronic apparatus and circuits of greatly reduced size it has become an increasingly difficult problem to provide means for connecting lead wires to circuits both at the time of installation and in connection with replacing worn out elements. The problem is particularly acute in connection with printed circuits where transistors are employed and the conventional way of connecting the transistors is by means of soldering. Repeated breaking and replacing of soldered connections drastically reduces the useful life period of such printed circuits.

An important object of my invention is to provide a socket for use in connection with printed circuits or the like which will at one and the same time permit rapid and easy connection of electrical lead wires to such circuits, remain effectively usable despite frequent changes in the circuit, and be suitable for firm and secure connection to the structural elements of the circuit itself. Another object of my invention is to provide such a socket into which a small lead wire may be inserted and firmly held therein under resilient forces within said socket while at the same time avoiding any permanent set in the socket elements due to the entrance of such lead wire.

It is a feature of my invention that tubular elements are employed and in this way I achieve great accuracy and close tolerances such that the elements of the socket fit snugly together and the entire socket fits snugly into a printed circuit or the like under conditions in which random forces will not normally change the position of the socket or its elements relative to each other. Another feature of my invention relates to the internal spring forces which bear against the lead wire within the socket and the arrangement for preventing the spring elements from receiving permanent distortion. This is accomplished in my invention by providing buttressing elements within the socket as well as inwardly sloping walls supporting the resilient elements which bear against the lead wire.

Further objects and features of my invention will best be understood and appreciated from a detailed description of a preferred embodiment thereof selected for purposes of illustration shown in the accompanying drawings, in which:

Fig. 1 is a cross sectional view in side elevation of the socket of my invention as employed, for instance, in a printed circuit; it should be noted that Fig. 1 is not a cross-section along a straight line from side to side but represents a cross-section along a bent line as will be seen in Fig. 2 designated along the lines 1—1, Fig. 2 is a plan cross-sectional view taken along the lines 2—2 of Fig. 1, Fig. 3 is a plan cross-sectional view along the lines 3—3 of Fig. 1, and Fig. 4 is a plan cross-sectional view of a modification of my invention shown principally in the area depicted in Fig. 2.

A preferred embodiment of my invention herein shown includes in its general organization a cylindrical body portion indicated at 10 and a cap indicated at 12. The material employed in these elements is a copper alloy and the elements may be conveniently formed in conventional watch-making metal forming machinery. Of course it may be possible to form these elements by die stamping techniques but in the preferred embodiment of my invention they are formed by metal turning equipment which provides extremely fine tolerances.

The body member 10 of my invention is a hollow cylinder having an open end 14 and a closed end 16. The enclosed end 16 is provided with an outwardly extending side flange 18 which forms a head element for the end 16 of the body 10. Below the flange 18 on the body 10 and extending for a short distance I provide a cap-anchoring shoulder 20. At the termination of the shoulder 20 and extending to the lower end of the body 10 I provide a socket retaining element 22 of reduced outside diameter and having substantially thin walls. A mid portion of the element 22 is formed with inwardly compressed walls 24 between which the narrowest inside dimension is substantially smaller than the outside diameter of the lead wire which is to be employed in the socket. The walls 24 may be seen in detail in Fig. 2 wherein they are shown as opposing the lead wire with convexly formed surfaces and in this way it will be seen that when a wire as indicated by phantom lines in the various figures of the drawings is inserted into the socket, the walls 24 will be urged outwardly by the wire and thereby in turn exert an inward bearing spring force against the wire.

It should be noted that when a socket of this form is employed in a printed circuit it is a very small jewel-like element having a total length of approximately .2" and therefore the walls 24 will necessarily be very thin and in actual fact quite weak. In order to overcome this it will be seen that the formation of the walls 24 in the socket element 22 leaves a sloping surface 26 which, in effect, supports and buttresses the walls 24. While the metal of the socket element 22 is extremely thin the sloping walls 26 actually serve substantially to buttress the walls 24 against permanent distortion and in this way the principal bearing force against the wire inserted into the socket of my invention will be applied substantially in the areas indicated at A in Fig. 1.

In order to further buttress the lower end of the socket element 22 and to provide an accurate and firm set between the composite socket and a base element 28 of a printed circuit, I form the cap element 12 of a similar tubular construction to the body element 10 but with an inside diameter adapted to establish a tight pressed fit over the shoulder 20 of the body 10. At the lower end of the cap 12 I provide an inwardly extending annular rim 30 against which the bottom end of the socket element 22 is formed at 32 to provide a tight fitting and supporting contact. In this way the rim 30 resists longitudinal distortion of the socket element 22 which would otherwise result from insertion of the wire, and by thus forcing the walls 24 to bend and absorb the distortion caused by the wire, a longer life and more effective contact is attained.

Thus when a wire is inserted into the socket the walls 24 will urge the sloping walls 26 outwardly and thereby attempt to distort the socket member 22. Such distortion is effectively resisted in the upper portion of the socket by the shoulder 20 of the body 10 and in the lower portion of the socket by the rim 30 of the cap 12. However, it will be seen that a narrow tolerance is provided at 34 between the rim 30 and the socket element 22 to accommodate a slight amount of such distortion without in any way disturbing the outer surface of the cap 12 which must remain in firm positive contact with the printed circuit base element 28.

The composite socket may be joined to a conductive portion 36 of the printed circuit by means of soldering at 38 adjacent to the flange 18.

A variation of my invention is shown in Fig. 4 in which the socket element 22 is provided with inwardly pressed walls 40 supported by sloping walls 42 which differ from the embodiment shown in Fig. 2 in that the cross-section form is elliptical rather than essentially triangular. Generally speaking, the embodiment shown in Fig. 4 is as effective as that shown in Fig. 2 but the wire is not necessarily retained in the exact center of the socket as will be the case with the embodiment shown in Fig. 2.

Since numerous variations of this preferred embodiment of my invention will now be apparent to those skilled in the art it is not my intention to confine the invention to the precise form herein shown but rather to limit it in terms of the appended claims.

Having thus disclosed and described the preferred embodiment of my invention, what I claim as new and desire to secure by Letters Patent of the United States is:

1. A socket comprising a hollow cylindrical body having an opened end and a closed end, an outstanding head forming flange on said closed end, a portion of said body having a reduced diameter, walls in said portion formed and arranged to enter and lie within the hollow of said body, a cap for said body including a second hollow cylinder fitting over said body in tight pressed fitting relation, an inwardly extending annular rim on said cap in contact with and buttressing the reduced diameter portion of said body.

2. The socket defined in claim 1 further characterized by said walls constructed and arranged to form a substantially triangular passage of reduced dimension.

3. The socket defined in claim 1 further characterized by said walls presenting a convex inner surface.

4. A socket comprising, a hollow cylindrical body, a flanged head on one end of said body, the other end of said body being open, a cylindrical shoulder coaxial and integral with said body adjacent to said head, a tubular extension of said body coaxial and integral with said shoulder, said tubular extension being of reduced outside diameter, walls integral with said tubular extension at a mid-portion thereof sloping inwardly and forming a passage of reduced dimension therein, a cap for said body including a second cylindrical member fitting onto said shoulder in tight pressed fitting relation, and means for buttressing the end of said tubular extension including an inturned rim on said cap.

5. The socket defined in claim 4 further characterized by an out-turned lip on said tubular extension contacting said inturned rim and the remainder of said rim close to but spaced from said tubular extension.

References Cited in the file of this patent

UNITED STATES PATENTS

| | | |
|---|---|---|
| 2,444,433 | Erb | July 6, 1948 |

FOREIGN PATENTS

| | | |
|---|---|---|
| 114,988 | Switzerland | May 17, 1926 |
| 786,768 | France | Jan. 17, 1935 |
| 881,186 | France | Jan. 15, 1943 |